United States Patent [19]
Peterkofsky et al.

[11] 3,899,457
[45] Aug. 12, 1975

[54] ETHERIFIED METHYLOLATED 2,7-DIOXO-4,5-DIMETHYL-DECAHYDRO-PYRIMIDO-[4,5-D]-PYRIMIDINE AND ITS USE IN ALKYD RESIN COATING COMPOSITIONS

[75] Inventors: Alan L. Peterkofsky, Newark; James E. Tracy, Bernardsville; Paul M. Schumacher, Hackettstown, all of N.J.

[73] Assignee: Celanese Corporation, New York, N.Y.

[22] Filed: Sept. 10, 1973

[21] Appl. No.: 395,487

Related U.S. Application Data

[63] Continuation of Ser. No. 135,747, April 20, 1971, abandoned.

[52] U.S. Cl............ 260/21; 117/132 B; 117/161 K; 117/161 LN; 260/22 CQ; 260/256.4 C
[51] Int. Cl...... B32b 27/06; C09d 3/52; C09d 3/66
[58] Field of Search........................................ 260/21

[56] References Cited
UNITED STATES PATENTS

| | | |
|---|---|---|
| 3,654,193 | 4/1972 | Seiner.............................. 117/37 R |
| 3,678,128 | 7/1972 | Riemhofer et al............. 117/161 K |
| 3,753,648 | 8/1973 | Powanda et al............. 260/256.4 F |
| 3,772,292 | 11/1973 | Martin et al.................. 260/256.4 F |
| 3,808,039 | 4/1974 | Kuzma................................... 260/21 |

*Primary Examiner*—Ronald W. Griffin
*Attorney, Agent, or Firm*—Thomas J. Morgan; John A. Shedden

[57] ABSTRACT

O-alkylated compounds of the formula

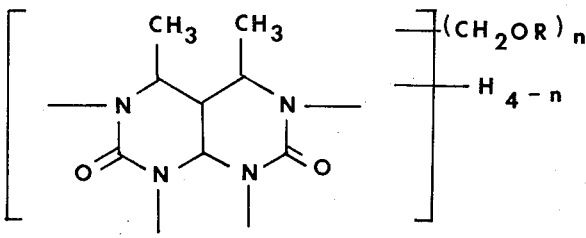

are disclosed wherein n is an integer from 1 to 4, inclusive, and R is a hydrogen substitutent or the alkyl residue of a monohydric alcohol, at least one of said R groups being said alkyl residue. These O-alkylated compounds are useful as cross-linking agents in alkyd resin coating compositions.

9 Claims, No Drawings

ETHERIFIED METHYLOLATED 2,7-DIOXO-4,5-DIMETHYL-DECAHYDRO-PURIMIDO-[4,5-D]-PYRIMIDINE AND ITS USE IN ALKYD RESIN COATING COMPOSITIONS

This is a continuation of application Ser. No. 135,747 filed Apr. 20, 1971, now abandoned.

BACKGROUND OF THE INVENTION

Alkyd resin enamels useful for coating kitchen appliances, washing machines, automobiles, and the like, must meet very rigorous specifications in view of their exposure to weathering and various chemicals, including detergents, caustics, acids, alcohols and staining agents. In addition, the enamels must exhibit satisfactory gloss, hardness, impact resistance, curing rates, and the like. Needless to say, millions of man hours have gone into the development of suitable enamels to meet the present annual market for millions of pounds. As is the case with all high-demand products, research persists in a continuing effort to improve on existing products.

A baked enamel presently enjoying substantial commerical success is prepared from alkyd resins crosslinked with aminoplast materials of the urea-formaldehyde and melamine-formaldehyde type, including the butylated derivatives thereof. The alkyd resin components are generally oil-modified polyester reaction products of polybasic acids, for example, a phthalic acid or its anhydride, and a polyol, for example, a triol such as glycerol. Optionally, a minor proportion of a monobasic acid or a dibasic acid, such as benzoic acid, substituted benzoic acid, adipic acid, or the like, can be present.

Of the condensation products of amines or amides, such as triazines, diazines, triazoles, guanidines, guanamines and the like with aldehydes, such as formaldehyde and acetaldehyde, the melamine-formaldehyde resins have, in general, provided the most desirable overall enamel properties as aminoplast components of alkyd resins. Urea-formaldehyde resins have been quite successful, also, not so much because of their overall effectiveness, particularly when compared with melamine-aldehyde resins, but because urea-aldehyde resins are significantly less expensive. Obviously, there is a real need for an aminoplast-type crosslinking agent of the calibre of a melamine-aldehyde aminoplast, yet without the cost handicap. This has been a long-standing need which has heretofore gone unfulfilled.

Therefore, it is an object of the present invention to provide an aminoplast cross-linking agent for baked enamels having good resistance to weathering and to various chemicals, including detergents, caustics, acids, alcohols, and staining agents.

Another object is to provide an aminoplast cross-linking agent for baked enamels with the cost advantages presently enjoyed by the urea/aldehyde-containing coating resins.

These and other objects of the present invention, as well as a fuller understanding of the advantages thereof, can be had by reference to the following detailed description and claims.

SUMMARY OF THE INVENTION

According to the present invention a novel class of compounds has been found with unusual "aminoplastic properties", so to speak, in enamels of the alkyd resin type, particularly with respect to hardness, chemical resistance, curing rates, and other like properties. Not only are these compounds generally superior to the urea-aldehyde aminoplasts but they are comparable and superior, as will be seen hereinafter, in significant respects to the relatively expensive melamine-aldehyde type resins.

The novel aminoplasts of the present invention are compounds which have the general formula:

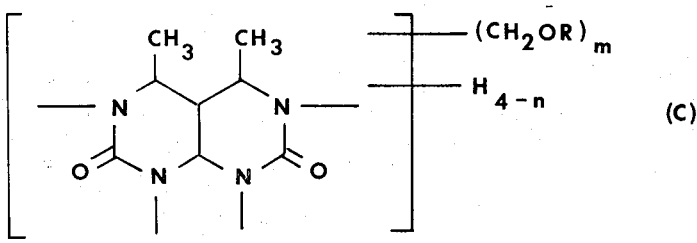

(C)

wherein $n$ is an integer from 1 to 4, inclusive and R can be a hydrogen substituent or the alkyl residue of a monohydric alcohol. At least one of the R groups is such an alkyl residue.

As will be seen hereinafter in more detail, compounds of the above formula (C) are derived from 2,7-dioxo-4,5-dimethyl-decahydropyrimido-[4,5-d]-pyrimidine which has the formula:

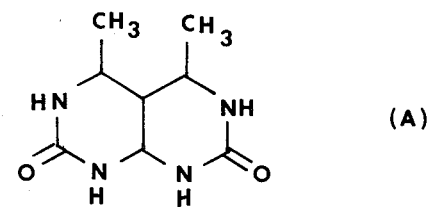

(A)

Alternatively, (C) can be derived from the methylolated form of (A), that is, compounds of the formula:

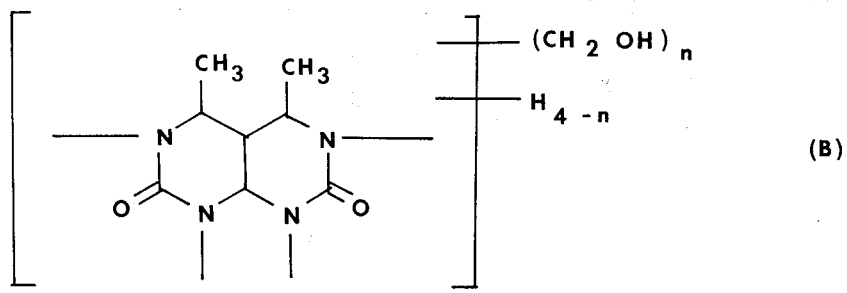

(B)

wherein $n$ has the same meaning as hereinbefore. The compound 2,7-dioxo-4,5-dimethyl-decahydropyrimido-[4,5-d]-pyrimidine (A) is disclosed in 92 *Monatschefte fur Chemie* 31 (1961). The preparation of this compound as well as that of material (B) are disclosed in copending U.S. application Ser. No. 135,776 filed on Apr. 20, 1971 by James E. Tracy, Paul M. Schumacher, and Alan L. Peterkofsky.

Etherification of (B) with a monohydric alcohol provides compounds of the formula (C), above, which are soluble in organic solvents and help impart this same solubility to alkyd resin coating compositions containing these compounds.

Typical monohydric alcohols useful for the etherification reactions contemplated herein are branched and straight-chain alkanols having up to about 12 carbon atoms; aromatic monohydric alcohols such as benzyl alcohol, and the like; cycloalkanols such as cyclohexanol, cyclopentanol, cycloheptanol, and the like, usually having about 4 to about 8 carbon atoms in the ring; monoethers of glycols such as Cellosolve* and Carbitol* compositions; and substituted monohydric alcohols wherein the substituent is inert in that it does not enter into or hinder the etherification reaction or deleteriously affect, say, the effectiveness of the ultimate coating composition or the compounding thereof. Typical substituents are halogen atoms, such as chlorine and bromine, and other like inert moieties.

*Trademarks for monoethers of glycols manufactured and sold by Union Carbide Corporation, New York, New York.

The alkyd resin components contemplated herein are generally prepared, as indicated hereinabove, from polybasic acids and polyfunctional alcohols, usually with a minor amount of oil modifier. Typical polybasic acids are phthalic acid, isophthalic acid, succinic acid, maleic acid, sebacic acid, adipic acid, linoleic acid, trimellitic acid, fumaric acid, and anhydrides of these acids. Typical polyfunctional alcohols contemplated herein are glycerol, pentaerythritol, mannitol, sorbitol, ethylene glycol, trimethylolpropane, trimethylol-ethane, diethylene glycol, 2,3-butylene glycol, and other like polyols. The triols are generally preferred.

As also indicated hereinbefore, the alkyd resins within the purview of the instant invention usually contain a minor proportion of oil modifier, usually a nondrying oil modifier, such as coconut oil or other saturated oil. Other oil modifiers which may be used are drying or semi-drying oils, such as fish oils, linseed oil, soybean oil, and the like.

Of course, the alkyd resin may contain, generally in relatively minor amounts, other components known in the art which are intended to modify certain properties for specific end-uses. For example, oil-free alkyd-aminoplast resin coating compositions containing aliphatic or aromatic di-epoxides are reported to have enhanced chemical resistance.

The compounds (C) can be prepared in several ways according to the present invention. For example, 2,7-dioxo-4,5-dimethyl-decahydropyrimido-[4,5-d]-pyrimidine can be reacted with a formaldehyde-monohydric alcohol solution, such as Formcel*, under controlled conditions of temperature and pH. Methyl Formcel and butyl Formcel refer to aqueous alcohol-formaldehyde solution mixtures wherein the alcohol components are methanol and butanol, respectively. The resulting product is the etherified aminoplast shown in formula (C), above. When methyl Formcel is the reactant, R of formula (C) is —$CH_3$; likewise, when butyl Formcel is the reactant, R is $CH_3CH_2CH_2CH_2$—.

*Trademark for aqueous alcohol-formaldehyde solutions manufactured and sold by Celanese Corporation, New York, New York.

If desired, 2,7-dioxo-4,5-dimethyl-decahydropyrimido-[4,5-d]-pyrimidine can first be reacted with formaldehyde and methylolated according to copending U.S. Application Ser. No. 135,776 mentioned above and the resulting methylolated product, (B), reacted with, say, a lower alkanol and the novel product of the present invention, viz., aminoplast material, (C), recovered.

The above just-mentioned processes can be described in equation form as follows:

Equation I

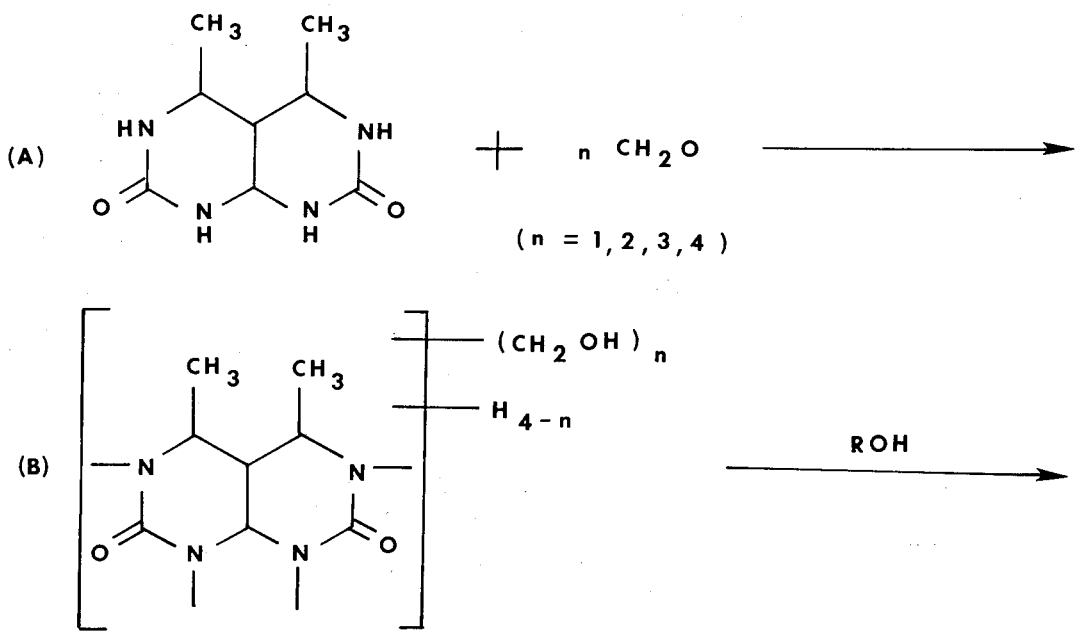

Equation I

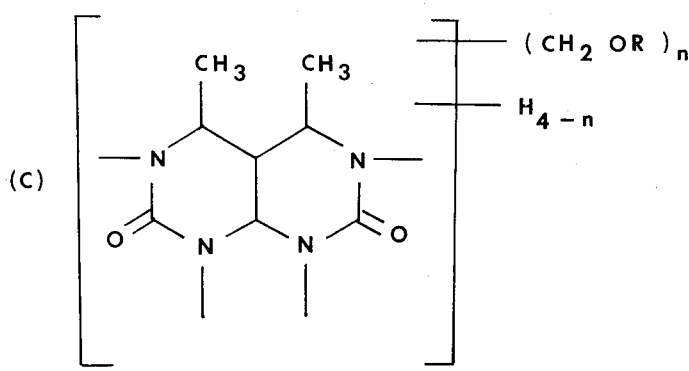

Alternatively, a Formcel solution, such as butyl Formcel, or the like, may be employed in a one-step process as follows:

Equation II

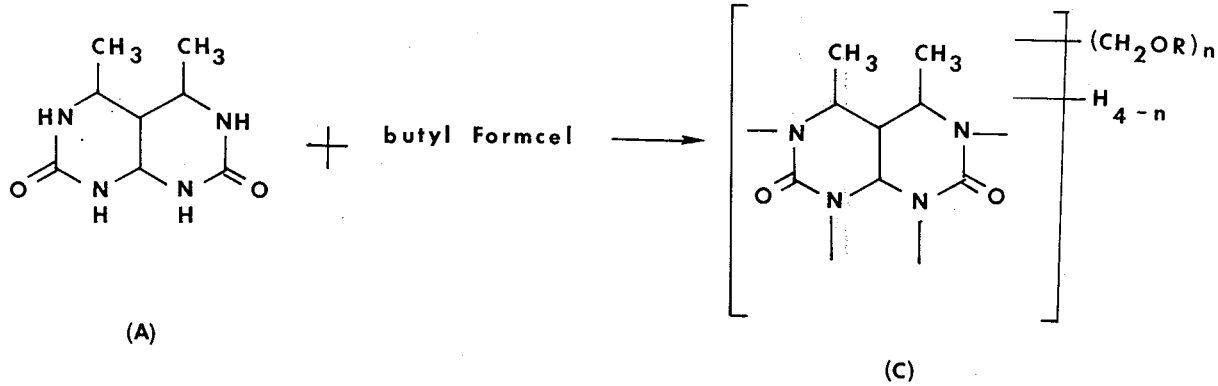

wherein R is either —H or —CH$_2$CH$_2$CH$_2$CH$_3$ (butyl), at least one R being butyl.

Reactant (A), above, viz., 2,7-dioxo-4,5-dimethyl-decahydropyrimido-[4,5-d]-pyrimidine, can be prepared by reacting urea with acetaldehyde in an acidic hydroxylic medium e.g., as described in 92 Monatschefte fur Chemie 31 (1961). While it has been found that 2,7-dioxo-4,5-dimethyl-decahydropyrimido-[4,5-d]-pyrimidine in the present invention is conveniently and preferably prepared according to the following procedure, it should be understood that other methods of synthesis can be used, parts and percentages being by weight unless otherwise indicated. Thus, 5280 parts of acetaldehyde are charged to a suitable conventional reaction vessel and cooled to below 20°C. Then a solution of 3600 parts of urea (60 moles) and 645 parts by weight of reagent grade sulfuric acid in 4275 parts of water are added dropwise with stirring to the acetaldehyde. During the addition, a suitable cooling means (e.g., an ice-bath) is applied to the reaction vessel, and the rate of addition is adjusted if necessary, in order to maintain the reaction system at a temperature of about 20°C. When the addition is complete, the reaction mixture is heated to atmospheric reflux temperature and maintained thereat for 1 hour. Thereafter, the reaction mixture is cooled to ambient temperature, diluted with water, and filtered to isolate the crystalline product. The product is washed with water, then with methanol, and finally recrystallized from water. Upon drying the recrystallized product at 70°C., it weighs 1467 parts (25 percent of the theoretical yield based on urea) and melts at 275°–280°C. Elemental analysis of the product corresponds to the formula C$_8$H$_{14}$N$_4$O$_2$.

The reaction of 2,7-dioxo-4,5-dimethyl-decahydropyrimido-[4,5-d]-pyrimidine with formaldehyde to produce compound (B) according to Equation I, above, is preferably accomplished by contacting (A) with between about 2.80 and about 5.0 molar equivalents of formaldehyde in a hydroxylic medium. The hydroxylic solvent used should be capable of being separated from the aminoplast material (B) formed in the reaction by evaporative means. The preferred solvent is water. The total concentration of the reactants in the hydroxylic medium is not critical.

In especially preferred modes of Equation I, the reaction is conducted with formalin, i.e., an aqueous solution of formaldehyde in which the concentration of the latter is between about 35 and about 40 percent. The reaction can also be conducted with paraformaldehyde, an oligomer, as the HCHO source. The amount of formaldehyde used can range, as indicated above, between about 2.80 and about 5.0 molar proportions, preferably between about 2.90 and about 3.05 molar proportions, per molar proportion of 2,7-dioxo4,5-dimethyl-decahydropyrimido-[4,5-d]-pyrimidine.

Thus, use of formaldehyde in amounts such that the molar ratio of formaldehyde to material (A) is less than about 2.80:1 is not as desirable because the product (B) would in such case be contaminated with substantial quantities of materials which could be deleterious in the finished resin. For this same reason, the use of formaldehyde: material (A) molar ratios in excess of about 5:1 is also undesirable.

The reaction between 2,7-dioxo-4,5-dimethyl-decahydropyrimido-[4,5-d]-pyrimidine and formaldehyde is catalysed by acid or base. Reaction can also be carried out without added catalyst. While the natural acidity of formalin is sufficient, reaction times are much longer. Also, acidic pH's are created during the reaction by conversion of some of the $CH_2O$ to formic acid. In aqueous media, the reaction can be conducted at a pH of less than or greater than 7. Desirably, the reaction is conducted at a pH of greater than about 8 and less than about 12, with a pH of between about 9 and about 10 being especially preferred.

The temperature and pressure at which the 2,7-dioxo-4,5-dimethyl-decahydropyrimido-[4,5-d]-pyrimidine and formaldehyde are reacted are not critical. Desirably, the reaction is conducted at an elevated temperature and atmospheric pressure, with a temperature corresponding to the atmospheric reflux temperature of the reaction menstruum being preferred. The time required for completion of the reaction is generally less than 1 hour. The exact time required depends upon the reaction temperature, concentration of the catalyst (i.e., the pH) and reactants. A conventional titration method for determining when a particular reaction system has reached equilibrium is referred to in connection with Example I hereinbelow.

The reaction product mixture may be filtered to remove insolubles prior to reacting with an etherifying reactant. To obtain an etherified product (C) suitable for use in alkyds soluble in organic solvents, water is removed. When etherifying with butanol, for example, the water can be removed by azeotropic distillation as the etherification is carried out. A similar process may be followed with other alcohols contemplated herein, such as cyclohexanol, benzyl alcohol, and the like.

With methanol, however, the bulk of the water is generally evaporated before etherification is performed. The water remaining after etherification can then be removed by co-distillation of methanol and water from the resulting aminoplast material (C) until essentially all the water is removed. The water-free resin can then be diluted to the desired solids content with a non-aqueous organic solvent. Thus, in the case of methylation, it is usually simpler to strip the aqueous solution of (B) to near dryness, add methanol, carry out etherification, and strip off any water remaining after the first stripping step, as well as water of reaction during etherification, as a methanol co-distillate.

A wide range of temperature may be used. Broadly, temperatures between about 30°C. and about 230°C. are suitable depending upon the monohydric alcohol employed.

Good results are achieved, for example at atmospheric reflux temperature using butanol. When methylating, however lower temperatures, such as 55°C., provide very good results. Normally, temperatures in the range of about 45°C. to about 205°C. are employed. Of course, higher temperatures are indicated should pressures above atmospheric pressure be desired; likewise, subatmospheric pressures dictate proportionately lower temperatures. Another virtue of the present invention is that it permits not only a wide choice of temperatures and pressures, but it functions well as a continuous, semi-continuous or batch process.

Generally, a broad pH range provides suitable results. Reaction is best carried out, however, at an acid pH in the range of about 1.5 to about 6.5, preferably between about 2.3 and about 5.5.

Concentrations best suited for the etherification reaction step may vary considerably and generally range between about 2.80 and about 6.0 molar equivalents, preferably between about 3.0 and about 5.5 molar equivalents of the monohydric alcohol, per mole of material (B) present in the reactant mixture. In the case of methanol, however, a range between about 2.8 and about 20.0 preferably between about 5.0 and 12.0, molar equivalents is desirable. Consequently, an overall range for the monohydric alcohol is from about 2.8 to about 20.0 molar equivalents.

The one-step process of Equation II, above, has a number of inherent advantages. In the first place, the aqueous monohydric alcohol-formaldehyde solution (hydroxylic medium is preferred) may be selected so as to expeditiously and efficiently provide high yields of etherified aminoplast (C) by what may be an in situ conversion from (A) to (B) to etherified (e.g., alkylated) aminoplast (C).

Typically, an aqueous 55% methyl Formcel solution containing 34–35% methanol and 55% formaldehyde (percentages by weight) is readily reacted at controlled temperatures and pH with 2,7-dioxo-4,5-dimethyl-decahydropyrimido-[4,5-d]-pyrimidine to provide, in a direct, one-step process, the corresponding etherified product (C) of the present invention. Although a wide variety of pH conditions can be used successfully, it is desirable to operate at a pH in the range of about 1.5 to about 6.5, and preferably between about 2.3 and about 5.5.

While best results are achieved at the atmospheric reflux temperature of the aqueous reaction mixture, the one-step process admits of a wide range of temperature and pressure conditions. Generally, temperatures in the range of about 30°C. to about 230°C., and desirably between about 45°C. and about 205°C., are used. In other words, the temperatures, pressures, concentrations and other conditions described with respect to the etherification step (2) of Equation I are suitable and desirable in the instant one-step process of Equation II, for much the same reasons given in discussing step (2) of Equation I. Likewise, the one-step process employed may be continuous, semicontinuous or batch.

DESCRIPTION OF PREFERRED EMBODIMENTS

The following examples disclose illustrative methods for preparing the novel compounds of the present invention and teach representative uses for these compounds in typical coating compositions. Unless otherwise stated, parts and percentages given in the examples are by weight. It should be clearly understood, also, that the examples are illustrative, generally preferred embodiments which are not intended to limit the scope of the present invention. In other words, it will be apparent to the person skilled in the art that numerous modifications, extensions, and variations are clearly within the spirit and scope of the present invention.

EXAMPLE I

To a suitable reaction vessel equipped with conventional agitation means are charged 239 grams (2.94 moles) of 37 percent formalin ("uninhibited") and 15 grams of a 10 percent aqueous solution of sodium carbonate. To the resulting mixture is added, with agitation, 198 grams (1.0 mole) of crystalline 2,7-dioxo-4,5-dimethyl-decahydropyrimido-[4,5-d]-pyrimidine. The reaction mixture, which has a pH of between about 9 and about 9.5, is heated to reflux temperature over the course of about 20 minutes and maintained at the reflux temperature for about 5 minutes. The reaction mixture is then cooled to ambient temperature, the pH is adjusted to 7.0, and the reaction mixture filtered to remove insolubles. The clear filtrate contains 2.5 percent free formaldehyde as determined by the "sodium sulfite method" described in Walker, *Formaldehyde*, 3d ed., p. 486 (Reinhold, N.Y. 1964). The concentration of aminoplast material in the aqueous filtrate is 60 percent by weight as determined gravimetrically, i.e., by evaporating an aliquot sample of the solution at 70°C for 6 hours and weighting the residue. The product, of course, is aminoplast material (B).

EXAMPLE II

This example illustrates a variant of the procedure used in Example I to produce the methylolated material (B).

To a suitable reaction vessel equipped with conventional agitation means are charged 2919 grams (36 moles) of 37 percent formalin ("uninhibited") and 135 grams of a 10 percent aqueous solution of sodium carbonate. To the resulting mixture is added, with agitation, 1982 grams (9 moles) of crystalline 2,7-dioxo- 4,-5-dimethyl-decahydropyrimido-[4,5-d]-pyrimidine. The reaction mixture, having a pH of between about 9 and about 9.5 is then heated at reflux temperature for 5 minutes and cooled to 55°C. An additional charge of 135 grams of 10 percent aqueous sodium carbonate and 990 grams (5 moles) 2,7-dioxo-4,5-dimethyl-decahydropyrimidio-[4,5-d]-pyrimidine are added and the reaction mixture is again heated to reflux temperature and maintained thereat for 30 minutes. Upon recooling the reaction mixture to ambient temperature, neutralizing the pH, and filtering, a solution of methylolated 2,7-dioxo-4,5-dimethyl-decahydropyrimide-[4,5-d]-pyrimidine is obtained which contains 2.0 percent unreacted formaldehyde.

EXAMPLE III

The clear filtrate of Example I is now charged to a reaction vessel equipped with a phase separation head, and the pH is adjusted to a value of 3.0 by the addition of 25 percent aqueous formic acid. An amount (370 parts) of butanol is added to the reaction vessel and the system is heated to reflux temperature (about 100°C.) and azeotropic distillation of water from the reaction mixture is continued until the temperature of the resin system reaches 117°C. The system is then cooled to ambient temperature and the product, butoxymethylated 2,7-dioxo-4,5-dimethyl-decahydropyrimido-[4,5-d]-pyrimidine is adjusted to a solids content of 50 percent.

EXAMPLE IV

The clear filtrate of Example II, above, is charged to a reaction vessel equipped with a phase separation head, and the pH is adjusted to a value of 3.0 by the addition of 25 percent aqueous formic acid. An amount (5000 grams; 50 moles) of cyclohexanol is added to the reaction vessel and the system heated to reflux temperature and azeotropic distillation of water from the reaction mixture is continued until the temperature reaches about 130°C. To guard against product resin decomposition or polymerization azeotropic distillation during the final stages is carried out under vacuum. The system is then cooled to ambient temperature and the product, cyclohexyloxymethylated 2,7-dioxo-4,5-dimethyl-decahydropyrimido-[4,5-d]-pyrimidine adjusted to the desired solids content.

EXAMPLE V

An amount (272.0 parts) of 55 percent methyl Formcel containing 149.6 parts of formaldehyde (55 percent by weight), 95.2 parts of methanol (35 percent by weight) and 10 percent water is charged to a reaction vessel, and the pH is adjusted to a value of 3.0 by the addition of an appropriate amount of 25 percent aqueous formic acid. To the reaction vessel is then added 198.0 parts of (A). The system is heated to reflux temperature (about 96°C) and maintained thereat for approximately 1 hour. At the end of this period, the temperature of the reaction mixture is reduced to approximately 55°C., followed by the addition of 262.0 parts of methanol. This temperature is maintained for a period of about 2 hours, during which time the pH is kept constant at 3.0 by the addition of appropriate quantities of 25 percent formic acid. At the end of the two-hour holding period, the reaction system is cooled to ambient temperature and the pH adjusted to 7.8 with 10 N sodium hydroxide. The reaction mixture is then filtered and evaporated under reduced pressure to remove water and excess methanol. The resulting residue of methoxymethylated 2,7-dioxo-4,5-dimethyl-decahydropyrimido-[4,5-d]-pyrimidine is re-dissolved in sufficient isopropanol to produce a solution containing 50 percent solids.

EXAMPLE VI

Butyl Formcel (206.0 parts) containing 82.4 parts of formaldehyde (40 percent by weight) and 109.2 parts of butanol (53 percent by weight) and n-butanol (62.0 parts) are charged to a reaction vessel equipped with a phase separation head, and the pH is adjusted to 2.3 by the addition of 25 percent aqueous formic acid. An amount (99.0 parts) of (A) is added to the reaction vessel and the system is heated to reflux temperature (about 100°C) and azeotropic distillation of water from the reaction mixture is continued until the temperature of the resin system reaches 117°C. The system is then cooled to ambient temperature and the product butoxymethylated 2,7-dioxo-4,5-dimethyl-decahydropyrimido-[4,5-d]-pyrimidine adjusted to a solids content of 50 percent by the addition of butanol.

EXAMPLE VII

Example V is repeated in every essential respect with the exception that methyl Formcel is replaced by the mixture of 405 parts of 37 percent formalin (uninhibited) and 688 parts of benzyl alcohol. The system is likewise heated to atmospheric reflux temperature for one hour and then cooled to approximately 55°C. by the addition of another 500 parts of benzyl alcohol. Subsequent to this step Example V is followed in every essential detail; benzyloxymethylated 2,7-dioxo-4,5-dimethyl-dedahydropyrimido-[4,5-d]-pyrimidine thus produced.

EXAMPLE VIII

Material (A) (396.0 grams), 92 percent flake paraformaldehyde (196.0 grams, containing 180 grams of formaldehyde and 16 grams of water), n-butanol (518.0 grams), and 10 percent aqueous sodium carbonate solution (30 grams) are charged to a reaction vessel equipped with a phase separation head. The mixture is heated to reflux (about 101°-103°C) and held thereat for 75 minutes. The pH at the end of this reflux period is 7.2. Aqueous formic acid 88 percent (5.0 grams), is then added to lower the pH to 5.3, and water is removed from the reaction mixture by azeotropic distillation until the temperature of the resin system reaches 117°C. After cooling to ambient temperature, the reaction mixture is filtered to give a clear solution of the product, butoxymethylated 2,7-dioxo-3,4-dimethyl-decahydropyrimido-[4,5-d]-pyrimidine.

EXAMPLE IX

Material (A) (396.0 grams), 92 percent flake paraformaldehyde (329.8 grams, containing 303.4 grams of formaldehyde plus 26.4 grams of water), and methanol (287.5 grams) are charged to a reactor and heated to reflux (about 94°C). After refluxing for 45 minutes, the pH is 5.4. Aqueous formic acid (88 percent) is added to lower the pH of 3.1. Refluxing is continued for an additional 20 minutes, then the mixture is cooled to 55°C and additional methanol (416.5 grams) is added. The mixture is maintained at 55°C for four hours, cooled to ambient temperature, and filtered to give a clear solution of the product, methoxymethylated 2,7-dioxo-3,4-dimethyl-decahyrdopyrimido-[4,5-d]-pyrimidine.

The products of the above examples are tested and compared with well-known crosslinking agents in a typical white enamel alkyd resin for coating compositions, derived from Duraplex*ND 77B resin.

*Trademark for a short-oil coconut alkyd resin sold by Rohm and Haas Co., Philadelphia, Pa.

Baking enamels are prepared at alkyd/amine ratios of 90/10, 80/20 and 70/30 and are baked at 250°F. on a conventional metal substrate, viz., Parker Test Panels, cold rolled steel, SPRA Bonderite 100 Treatment, 4 inches ×8 inches 24 GA. and Parker Test Panels Aluminum 3003-H14, Bonderite 721 treatment, 4 inches ×8 inches (for flexibility test), which are available from Hooker Chemical Co., Parker Division, Detroit, Michigan. Paint films of approximately 1.5 mil thickness (dry) are obtained by drawing down films of 0.003 inch wet thickness using a Bird Film Applicator (Gardner Laboratory, Bethesda, Md.). Wet films are allowed to air dry for about 20 minutes, and then oven cured at specified temperatures for specified times. Rate of cure is determined by plotting development of hardness (pencil test) vs. cure temperature and time. Gloss: Standard 60° gloss angle measurement determined on a Hunterlab Model D16 Glossmeter (Hunter Associates Laboratories, Inc., Fairfax, Va.) in accordance with ASTM D523.

The etherified aminoplast product of Example VI, above, and the Uformite**resins described hereinafter are formulated into baking enamels (alkyd/amine ratios of 90/10, 80/20 and 70/30) according to the conventional method and formulation shown in the following table:

**Trademark for resins sold by Rohm and Haas Co., Philadelphia, Pa.

TABLE I

| Roller Mill Grind | WHITE BAKING ENAMEL | | |
|---|---|---|---|
| | Pounds | Pounds | Pounds |
| Titanium Dioxide | 16.6 | 16.6 | 16.6 |
| Duraplex ND-77B (60% Solids) | 11.7 | 11.7 | 11.7 |
| Mix With | | | |
| Duraplex ND-77B (60% Solids) | 13.3 | 10.5 | 7.5 |
| Amino Resin (50% Solids) | 3.4 | 6.7 | 10.0 |
| Xylol | 8.6 | 8.1 | 7.5 |
| Catalyst Solution* | 0.5 | 0.5 | 0.5 |
| Physical Constants | | | |
| Percent Solids | 62.1 | 62.1 | 62.1 |
| Pigment/Vehicle | 1/1 | 1/1 | 1/1 |
| Alkyd/Amino | 90/10 | 80/20 | 70/30 |

*Catalyst is 20% solution of p-toluenesulfonic acid in methanol

The test panels prepared from these formulations exhibited the properties shown in Table II, below:

TABLE II

| Aminoplast: | Temp. | Conc. (by weight) | Pencil Hardness | Reverse Impact (Inch-lbs) | Concial Mandrel | 1% Tide* 50 Hours | 5% NaOH 5-24[1] | Merthiolate 1-24[2] |
|---|---|---|---|---|---|---|---|---|
| BUTYLATED UREA-HCHO. UFORMITE F-200E | 250°F | 90/10 | — | — | — | — | — | — |
| | | 80/20 | 4 | 2-4 | 0.25 | 0 | 2-0 | **S-S |
| | | 70/30 | 7 | 2-4 | 1.75 | 0 | 8-0 | ***NS-S |
| | 300°F | 90/10 | — | — | — | — | — | — |
| | | 80/20 | 4 | 2-4 | 0.25 | 0 | 2-0 | S-S |
| | | 70/30 | 7 | 2-4 | 1.63 | 0 | 2-0 | S-S |
| AMINOPLAST MATERIAL (C) | 250°F | 90/10 | 4 | 6-8 | 0.0 | 0 | 2-0 | NS-S |
| | | 80/20 | 6 | 2-4 | 0.38 | 3 | 8-2 | S-S |
| | | 70/30 | 7+ | 2-4 | 1.0 | 5 | 10-4 | NS-NS |
| PREPARED IN EXAMPLE V | 300°F | 90/10 | 4 | 14-16 | 0.0 | 0 | 2-0 | NS-NS |
| | | 80/20 | 8 | 2-4 | 0.63 | 4 | 10-2 | NS-NS |
| | | 70/30 | 8 | 2-4 | 2.90 | 6 | 10-2 | NS-S |
| | | 90/10 | 4 | 10-12 | 0 | 0 | 4-0 | S-S |

TABLE II—Continued

PROPERTIES OF ENAMEL PANELS (Oven Time = 30 minutes)

| Aminoplast: | Temp. | Conc. (by weight) | Pencil Hardness | Reverse Impact (Inch-lbs) | Concial Mandrel | 1% Tide* 50 Hours | 5% NaOH 5-24[1] | Merthiolate 1-24[2] |
|---|---|---|---|---|---|---|---|---|
| BUTYLATED | 250°F | 80/20 | 7 | 6-8 | 0.25 | 6 | 8-4 | S-S |
| MELAMINE- | | 70/30 | 7 | 2-4 | 4.13 | 8 | 10-8 | NS-S |
| HCHO | | 90/10 | 4 | 10-12 | 0 | 0 | 5-2 | S-S |
| UFORMITE | 300°F | 80/20 | 8 | 2-4 | 1.0 | 6 | 8-4 | S-S |
| MM-55 | | 70/30 | 8 | 0-2 | 6.13 | 8 | 10-8 | NS-NS |

All panels had commercially acceptable gloss.
*Tide is a trademark for a detergent sold by Procter & Gamble, Cincinnati, Ohio
**S = Stain
***NS = No Stain Scale
HB-F = 4  2H-3H = 7
F-H = 5   3H-4H = 8
H-2H = 6

| Aminoplast: | Temp. | Conc. (by Weight) | Ethanol 1-24[2] | Acetone 1-24[2] | 19% HCL 1-24[2] | 40% H₂SO₄ 1-24[2] | 100% HOAc 1-24[2] |
|---|---|---|---|---|---|---|---|
| BUTYLATED | | 90/10 | — | — | — | — | — |
| UREA-HCO. | 250°F | 80/20 | 2-2 | 2-2 | 2-0 | 2-2 | 6-0 |
| UFORMITE | | 70/30 | 8-2 | 6-6 | 2-0 | 2-2 | 6-0 |
| F-200E | | 90/10 | — | — | — | — | — |
| | 300°F | 80/20 | 2-2 | 0-0 | 2-0 | 2-2 | 6-0 |
| | | 70/30 | 2-2 | 0-0 | 2-0 | 2-2 | 6-0 |
| AMINOPLAST | | 90/10 | 8-8 | 2-0 | 2-0 | 10-2 | 6-0 |
| MATERIAL (C) | 250°F | 80/20 | 8-8 | 6-6 | 2-0 | 10-4 | 6-0 |
| | | 70/30 | 8-8 | 8-6 | 2-0 | 10-6 | 6-0 |
| PREPARED IN | | 90/10 | 8-8 | 2-0 | 2-0 | 8-2 | 6-0 |
| EXAMPLE V | 300°F | 80/20 | 8-8 | 0-0 | 2-0 | 10-2 | 6-0 |
| | | 70/30 | 8-8 | 8-0 | 2-0 | 10-4 | 6-0 |
| | | 90/10 | 2-2 | 0-0 | 10-2 | 10-8 | 2-0 |
| BUTYLATED | 250°F | 80/20 | 8-8 | 6-6 | 8-8 | 10-2 | 10-0 |
| MELAMINE- | | 70/30 | 10-8 | 6-6 | 8-0 | 10-6 | 6-0 |
| HCHO | | 90/10 | 2-2 | 0-0 | 10-2 | 10-10 | 2-0 |
| UFORMITE | 300°F | 80/20 | 4-4 | 6-6 | 10-0 | 10-10 | 6-0 |
| MM-55 | | 70/30 | 8-8 | 8-8 | 8-0 | 10-0 | 8-6 |

[1] Recorded after 5 hours and after 24 hours
[2] Recorded after 1 hour and after 24 hours Chemical Tests
0 = denuded    10 = unaffected The novel methoxymethylated 2,7-dioxo-4,5-dimethyl-decahydropyrimido-[4,5-d]-pyrimidine compound of the present invention likewise exhibits very desirable physical properties and chemical resistance, at least comparable and often superior to the butylated urea-formaldehyde resins. The novel butoxymethylated 2,7-dioxo-4,5-dimethyl-decahydropyrimido-[4,5-d]-pyrimidine compound of the present invention, as is evident from Table II, above, is generally superior to the commercial butylated urea-formaldehyde resin in physical properties and chemical resistance and compares favorably in most respects with commercial butylated melamine-formaldehyde.

For example, the rate of cure at 250°F. and 300°F., as determined by pencil hardness, of the Example V and VI products at alkyd/amino concentrations of 80/20 surpassed both commercial resins under identical curing conditions and concentrations.

The tests for physical and chemical properties reported in Table II, above, are conventional
  Conical Mandrel - ASTM D 522
  Reverse Impact - (Gardner Laboratories, Bethesda, Md.)
  Pencil Hardness - 3B, 2B, B HB, F, H, 2H, 3H, 4H (increasing hardness)
  1% Tide/50 hr. - ASTM D 2248
  Stain and Chemical Resistance Tests - ASTM D 1308

While the tests carried out hereinabove use alkyd/amino resin weight concentrations of 90/10, 80/20 and 70/30 based on the total weight of the alkyd and aminoplast components, these are merely illustrative. If desired, concentrations in the range of about 95/5 to about 40/60 may be used in preparing various coating compositions, depending upon the end use intended for these compositions. Generally, a concentration in the range of about 93/7 to about 55/45 is preferred.

Pursuant to statutory requirements, there are described above the invention and what are now considered its best embodiments. It should be understood, however, that the invention can be practiced otherwise than as specifically described, within the scope of the appended claims.

We claim:

1. A coating composition comprising an alkyd resin and an esterified aminoplast material, (C), of the formula:

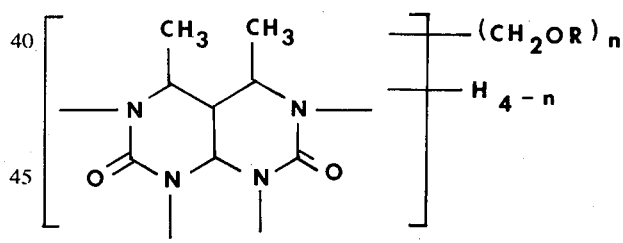

wherein n is an integer from 1 to 4 and R is a hydrogen substituent or the residue of a monohydric alcohol, at least one of said R groups being said alkyl residue.

2. The composition of claim 1 wherein the monohydric alcohol is a branched or straight chain, substituted or unsubstituted alkanol having up to about 12 carbon atoms, a substituted or unsubstituted aromatic monohydric alcohol, or a substituted or unsubstituted cycloalkanol having from about 4 to about 8 carbon atoms in the ring.

3. The composition of claim 2 wherein the monohydric alcohol is methanol.

4. The composition of claim 2 wherein the monohydric alcohol is n-butanol.

5. The composition of claim 2 wherein the monohydric alcohol is benzyl alcohol.

6. The composition of claim 2 wherein the monohydric alcohol is cyclohexanol.

7. The composition of claim 2 wherein component (C) is present in the concentration of about 5 to about 60 percent by weight of the total of the alkyd resin and component (C).

8. The composition of claim 2 for use in a baking enamel wherein component (C) is present in the concentration of about 7.0 to about 45 percent by weight of the total of the alkyd resin and component (C).

9. In the process of preparing baked enamel coatings composed of an alkyd resin and an aminoplast the improvement wherein said aminoplast comprises R-oxymethylated 2,7 dioxo-4,5-dimethyl-decahydropyrimido-[4,5-d] pyrimidine of the formula:

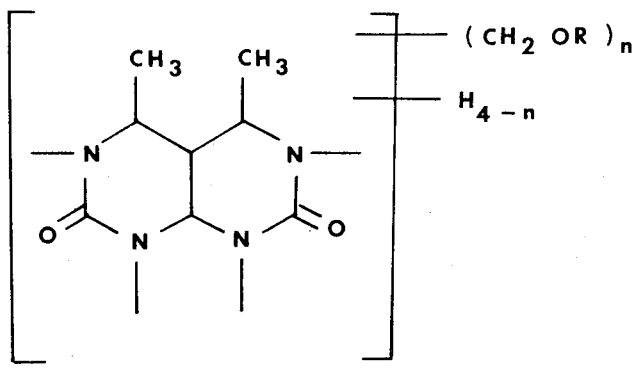

wherein $n$ is an integer from 1 to 4, R is hydrogen or Z and at least one of the R substituents is Z, where Z is selected from the group consisting of methyl, butyl, benzyl and cyclohexyl.

* * * * *